United States Patent Office 3,574,840
Patented Apr. 13, 1971

3,574,840
ANALGESIC, ANTITHERMIC AND ANTI-INFLAMMATORY TABLETS AND METHODS WITH 2-PHENYL - 7 - BROMO-QUINOLINE - 4 - CARBOXYLIC ACID OR SALTS THEREOF
Eugene Riviere, Issy-les-Mouleneaux, and Roger Lucien Debrie, Brenouille, France, assignors to Ugine Kuhlmann, Paris, France
No Drawing. Filed Oct. 29, 1968, Ser. No. 771,646
Claims priority, application France, Oct. 31, 1967, 126,509
Int. Cl. A61v 27/00
U.S. Cl. 424—258    4 Claims

ABSTRACT OF THE DISCLOSURE

The present invention provides a process for the treatment of algesic, thermic and inflammatory manifestations in mammals which comprises administering to the mammal 2 - phenyl - 6 - bromo - quinoline-4-carboxylic acid or the sodium or magnesium salt thereof. The present invention also provides a composition comprising 2-phenyl - 6 - bromo - quinoline - 4 - carboxylic acid or the sodium or magnesium salt thereof and a pharmaceutically acceptable carrier.

---

The present invention relates to a new medicine with analgesic, antithermic and anti-inflammatory properties.
2 - phenyl - 6 - bromo - quinoline-4-carboxylic acid of formula

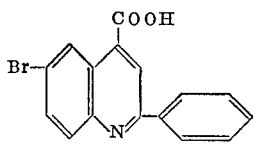

is a known product, but it has not until now been shown to possess curative properties in human therapeutics. It has now been found that this product, in the form of the free acid or in the form of its sodium or magnesium salt constitutes a medicament which is of more interest than 2 - phenyl - quinoline-4-carboxylic acid which is known by the name of Atophan and this interest is quite unexpected.

Preparation of the free acid

This product may be prepared for example by the action of acetophenone in alkaline medium on 5-bromo-isatin according to the following process. The parts given are by weight unless the contrary is indicated.

180 parts of a 50% solution of potassium hydroxide and 50 parts of distilled water are charged into an apparatus with three necks and a capacity of 500 parts by volume, fitted with a stirring device, a condenser and a thermostat. 5 parts of 5-bromo-isatin, 40 parts of acetophenone and 3 parts of decolourising charcoal are introduced at about 50° C. with stirring. Copious precipitation takes place and then homogenisation follows. The temperature is maintained at 110° C. for 15 hours. The mass is partly neutralised by slowly introducing, at the refluxing temperature, 100 parts by volume of 35.5% by weight hydrochloric acid. The pH must be between 10.5 and 11. The mixture is diluted with 100 parts by volume of a saturated solution of potassium chloride and left to cool while stirring for 24 hours. The potassium salt of 2-phenyl - 6 - bromo-quinoline-4-carboxylic acid crystallises, and is filtered off, and washed with a saturated and cold solution of potassium chloride until the filtrate is colourless. It is then taken up in 1500 parts of boiling water containing 9 parts of decolourising charcoal. After solution has occurred, the product is filtered and the 2-phenyl-6-bromo-quinoline-4-carboxylic acid is precipitated at the boil by the addition of 60 parts by volume of 90% acetic acid. At pH 4.5 to 5 the precipitation is complete. It is allowed to cool, filtered off, washed well with distilled water and dried at 80–90° C. 82 parts are obtained, which represents 75% of the theoretical.

The product is in the form of a light yellow amorphous powder of melting point 239–240° C. It is insoluble in water, soluble to 3% in hot alcohol and to 2.5% in hot acetone, and insoluble in the cold in organic solvents.

The percentage analysis gives:
Theory (percent): C, 58.53; H, 3.04; N, 4.26; Br, 24.39. Found (percent): C, 58.83; H, 3.12; N, 4.10; Br, 24.29.

By alkalimetry, the content is 99%.

Preparation of the sodium salt 25 parts of the free acid are suspended in 300 parts of water, the suspension is heated to 60° C. and about 8.5 parts by volume of a 30% solution of sodium hydroxide are added. The mixture is then brought to the boil and if necessary the pH is adjusted to between 10 and 10.5. 3 parts of active carbon black are added to the solution, which is filtered and evaporated to dryness under vacuum. Weight obtained: 25 parts (pH of the 1% aqueous solution: 9).

Preparation of the magnesium salt 60 parts of the free acid are dissolved in 500 parts of distilled water with stirring at a temperature near to boiling, by means of 20 parts by volume of a 30% solution of sodium hydroxide. The medium must be slightly alkaline (pH 9.5–10). The solution is filtered and cooled.

A solution of 18.5 parts of crystalline magnesium chloride ($MgCl_2.6H_2O$) in 50 parts of distilled water is also prepared. The magnesium chloride solution is slowly introduced with stirring into the solution of the sodium salt of 2 - phenyl - 6 - bromo-quinoline-4-carboxylic acid at a temperature of 15–20° C. Magnesium 2-phenyl-6-bromo-quinoline-4-carboxylate is precipitated. The product is stirred for one hour, then the precipitate is filtered off, washed with distilled water and dried at 90° C. 62 parts of the magnesium salt are obtained.

Toxicological and pharmacological properties of 2-phenyl-6-bromo-quinoline-4-carboxylic acid The analgesic, antithermic and anti-inflammatory properties of this acid have been demonstrated with a series of tests and by comparison with known reference products, especially phenylcinchoninic acid.

Lethal dose 50

When administered orally and by a gastric tube to albino mice of Charles Rivers CD 1 strain, the LD 50 is 890 mg./kg. The tolerance is distinctly superior to that of phenylcinchoninic acid.

Analgesic action

This has been determined by the phenylbenzoquinone technique on mice according to the method described by E. Siegmund, R. Cadmus and Lug. Proc. Soc. Exp. Biol. Med., 1957, 95, 729.

This technique consists in injecting mice intraperitoneally with 0.25 ml. of a 0.02% aqueous-alcoholic solution of phenylbenzoquinone. With most of the control animals this injection caused, in less than 10 minutes, a syndrome characterised by intermittent contractions of the abdomen with twisting of the trunk and very often with extension of the hind feet.

After administration of the product being investigated the mice are observed for 5 minutes, each 15 minutes. Mice which during this interval of 5 minutes showed no reaction were considered as having undergone an analgesic effect.

The Active Dose 50 (AD 50) of a product is the dose which, at the time when its effect is at its peak, suppresses in 50% of the animals the painful manifestations caused by the phenylbenzoquinone.

The AD 50 of the free acid of this invention is 75 mg./kg., although it is 225 mg./kg. for acetylsalicylic acid and 125 mg./k. for phenylcinchoninic acid.

Anti-inflammatory action

This was determined by the technique of the carrageen abscess in rats according to the method described by K. F. Benitz and L. M. Hall, Arch. Pharmacod., 1963, 144, 185.

The subcutaneous injection of the rat in the dorsal region with 0.5 ml. of a suspension of 2% of carrageen in distilled water gives rise to the formation of an abscess in 24 hours.

In this technique the AD 50 of a product is the total dose of this product per kilo of body weight which causes in 50% of the animals a reduction by at least 30% of the average weight of the abscess with respect to the average weight of the abscess of the control animals.

The AD 50 is 120 mg./kg. although it is 200 for acetylsalicylic acid and 180 for phenylcinchoninic acid.

Antithermic activity

According to the technique of hyperthermia caused in the rat by brewer's yeast and according to the method described by R. Domenjoz, An. N.Y. Acad. Sc., 1960, 86, 263, the Effective Dose 50 (ED 50) is about 400 mg./kg. although it is 800 for phenylcinchoninic acid.

Rats are made hyperthermic by a subcutaneous injection of a 15% suspension of brewer's yeast in a 1% aqueous solution of gum tragacanth. 4 hours later a hyperthermia of about 2° C. is established and persists for about 24 hours.

In this test the ED 50 of a product is the dose of this product which during the 4 hours which follows its administration, reduces by 50% the hyperthermia caused by the brewer's yeast.

In this hyperthermic test in which 2-phenyl-6-bromo-quinoline-4-carboxylic acid is administered by mouth to the rat the anti-thermic reaction is twice as strong as that of phenylcinchoninic acid, the ED 50 in mg./kg. being 400 whereas it is 800 for phenylcinchoninic acid.

Ulcerogenic action

This was determined by the technique of A. Robert and J. E. Nezamis, Proc. Soc. Exp. Biol. Med., 1958, 99, 443, on rats and the average ulcer index is 1.8 for a dose of 100 mg./kg., although it is 2.4 for phenyl-cinchoninic acid.

The sum total of these tests demonstrates the analgesic, antithermic and anti-inflammatory properties of 2-phenyl-6-bromo-quinoline-4-carboxylic acid.

Applications

2 - phenyl - 6 - bromo - quinoline-4-carboxylic acid is administered to people afflicted with rheumatism or other inflammatory syndromes at a dose of 3 to 5 tablets per day for a series of 4 days, the composition of the tablets being 0.40 g. of the active principle and the quantity "Q.S." comprising oxcipients of the conventional type such as for example starch, talcum or magnesium stearate.

The sodium salt is administered parenterally at the rate of 0.40 g. of the active principle to a 10 cc. ampoule at the rate of one to two ampoules per day.

We claim:
1. Compressed tablet useful for the treatment of algesic, thermic and inflammatory manifestations comprising an effective amount of 2-phenyl-6-bromo-quinoline-4-carboxylic acid or the sodium or magnesium salt thereof in a pharmaceutically acceptable carrier for said compound.

2. The compressed tablet of claim 1 wherein said effective amount is 0.4 g.

3. Process for the treatment of algesic, thermic and inflammatory manifestations in a mammal which comprises administering orally to the mammal an effective amount of 2-phenyl-6-bromo-quinoline-4-carboxylic acid at doses up to 2,000 mgs. daily.

4. Process for the treatment of algesic, thermic and inflammatory manifestations in a mammal which comprises administering parenterally an effective amount of the sodium salt of 2-phenyl-6-bromo-quinoline-4-carboxylic acid at doses up to 800 mgs. daily.

References Cited

Chem. Abst., 49–328e (1954).

STANLEY J. FRIEDMAN, Primary Examiner